(12) United States Patent
Rozin

(10) Patent No.: US 6,552,734 B1
(45) Date of Patent: Apr. 22, 2003

(54) SYSTEM AND METHOD FOR GENERATING A COMPOSITE IMAGE BASED ON AT LEAST TWO INPUT IMAGES

(75) Inventor: Daniel H. Rozin, New York, NY (US)

(73) Assignee: Smoothware Design, New York, NY (US)

( * ) Notice: Subject to any disclaimer, the term of this patent is extended or adjusted under 35 U.S.C. 154(b) by 0 days.

(21) Appl. No.: 09/302,206

(22) Filed: Apr. 29, 1999

(51) Int. Cl.[7] .............................. G09G 5/00; G06K 9/00; G06K 9/40; G06K 9/36
(52) U.S. Cl. .................. 345/629; 345/630; 382/154; 382/263; 382/276
(58) Field of Search .................. 345/1.1, 1.2, 418, 345/619, 629, 641, 630; 348/553, 581; 382/299, 263, 154, 276

(56) References Cited

U.S. PATENT DOCUMENTS

| | | | | |
|---|---|---|---|---|
| 5,128,776 A | * | 7/1992 | Scorse et al. | 358/432 |
| 5,142,616 A | * | 8/1992 | Kellas et al. | 395/135 |
| 5,268,994 A | * | 12/1993 | Keskes | 395/121 |
| 5,696,848 A | * | 12/1997 | Patti et al. | 382/254 |
| 5,867,606 A | * | 2/1999 | Tretter | 382/261 |
| 6,009,197 A | * | 12/1999 | Riley | 382/199 |
| 6,122,442 A | * | 9/2000 | Purcell et al. | 395/118 |
| 6,211,889 B1 | * | 4/2001 | Stoutamire | 345/442 |

OTHER PUBLICATIONS

J. Herault et al., "Center "Psycho–Vision"," http:/www–tirf.inpg.fr/THEMESOLD/psychovision.html. Translation is provided.

* cited by examiner

Primary Examiner—Vijay Shankar
(74) Attorney, Agent, or Firm—Kenyon & Kenyon

(57) ABSTRACT

A system receives and/or generates a first input image and a second input image. The system generates a first low frequency image as a function of the first input image, and a second low frequency image as a function of the second input image. Subsequently, the system generates the resulting image as a function of the first low frequency image, the second low frequency image and the second input image. A user may observe the first input image when the user views the resulting image at a first predetermined distance. In addition, the user may observe the second input image when the user views the resulting image at a second predetermined distance.

31 Claims, 15 Drawing Sheets

(4 of 15 Drawing Sheet(s) Filed in Color)

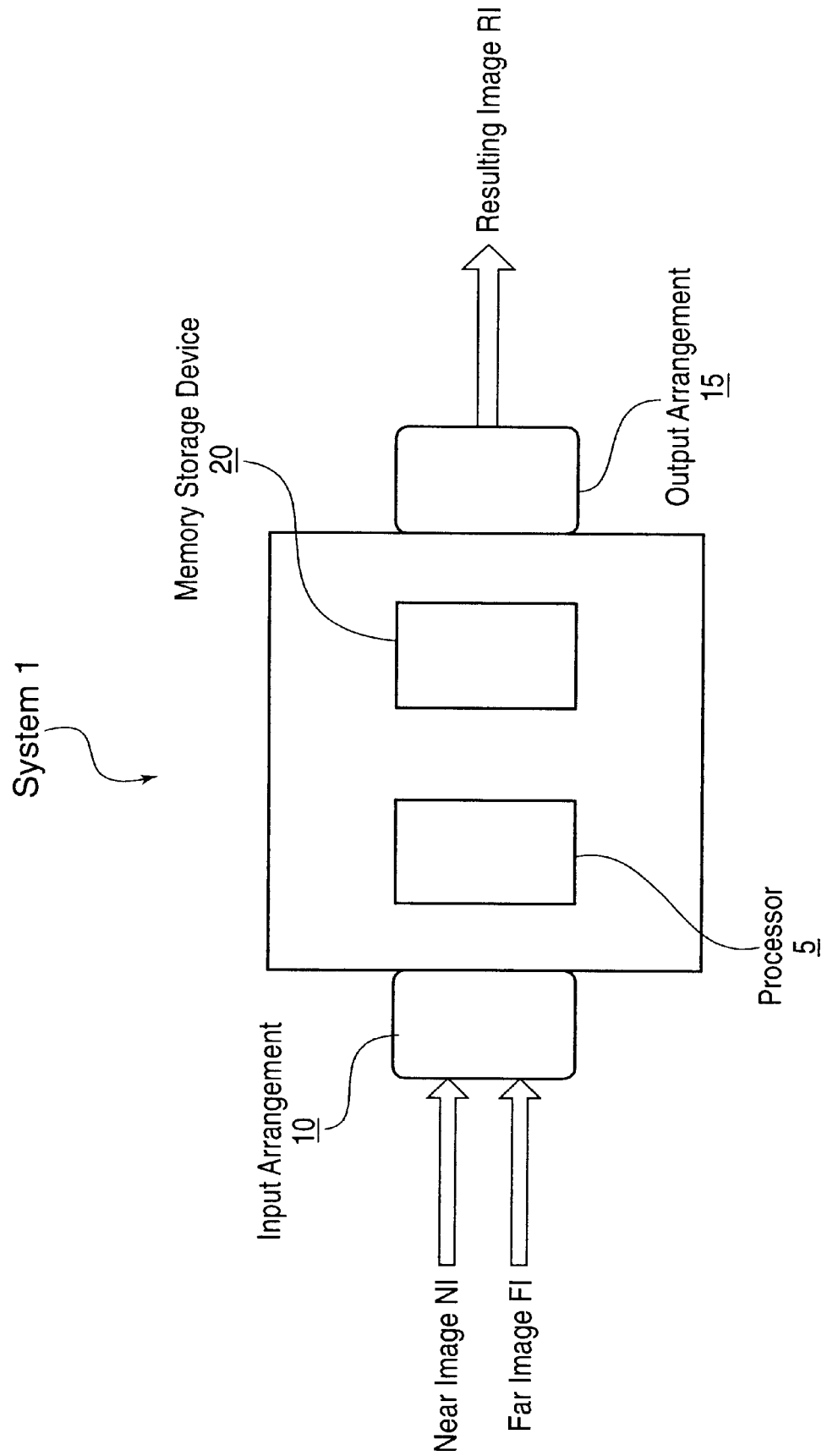

SYSTEM AND METHOD FOR GENERATING A COMPOSITE IMAGE BASED ON AT LEAST TWO INPUT IMAGES

FIELD OF THE INVENTION

The present invention relates to an image technology, and in particular, to a system and method for generating a composite image based on at least two input images.

BACKGROUND INFORMATION

When a human views an image from a great distance, such image is viewed using a small subset of the human eye's visual receptors. The perceived resolution of the image is very low, and only low frequency aspects of the image are registered in the human brain. However, from a close distance, the image is seen by a large number of visual receptors in the eye.

It is possible for all areas of the image not to be seen simultaneously. It is also possible that some areas (which are viewed by a center of the eye) are interpreted at a very high resolution and in full color, while other areas of the image (which are viewed by the periphery of the eye) are interpreted with a lesser resolution and with hardly any color perception.

Currently, to display two images, there must be an adequate space provided for each image. However, in a case of printed materials, an advertisement space or a screen area, the space may be limited and expensive. Thus, there is a need for a system and method which would allow a generation of a single image which is based on at least two original images, such that each of the original images may be viewed individually based on a distance from the composite image.

SUMMARY OF THE INVENTION

The present invention relates to a system and method for generating a resulting image based on at least two input images. The system receives and/or generates a first input image and a second input image. Then, the system generates a first low frequency image as a function of the first input image, and a second low frequency image as a function of the second input image. Subsequently, the system generates the resulting image as a function of the first low frequency image, the second low frequency image and the second input image. A user may observe the first input image when the user views the resulting image at a first predetermined distance. In addition, the user may observe the second input image when the user views the resulting image at a second predetermined distance.

BRIEF DESCRIPTION OF THE DRAWINGS

The file of this patent contains at least one drawing executed in color. Copies of this patent with color drawings (s) will be provided by the Patent and Trademark Office upon request and payment of the necessary fee.

FIG. 1 shows an exemplary embodiment of a system according to the present invention.

FIG. 2b shows another embodiment of the method illustrated in FIG. 2a.

FIG. 2c shows yet another embodiment of the method illustrated in FIG. 2a.

FIG. 6b shows another embodiment of the method illustrated in FIG. 6a.

DETAILED DESCRIPTION

A method and system according to the present invention generates a resulting image RI based on one or more input images (e.g., preferably two images: a near image NI and a far image FI). In particular, a resulting image RI may incorporate the near image NI which is altered in such a manner that its low frequency details may be substituted with low frequency details of the far image FI. When the resulting image RI is viewed at a first predetermined distance, the eye perceives it as the near image NI. However, when the resulting image RI is viewed from the greater distance (e.g., a second predetermined distance which is greater than the first predetermined distance), the eye perceives the resulting image RI as the far image FI.

Each image (i.e., the near image NI, the far image FI and the resulting image RI) has a digital structure and is divided into a plurality of pixels. Each pixel has a particular color which is expressed as a color value. For example, the color value of a pixel of a black-white image may range, e.g., between "0" and "255", where "0" represents a black color and "255" represents a white color.

Figure 9:
FIG. 9 is a color photograph showing an exemplary input image to be provided to the system according to the present invention.
Figure 10:
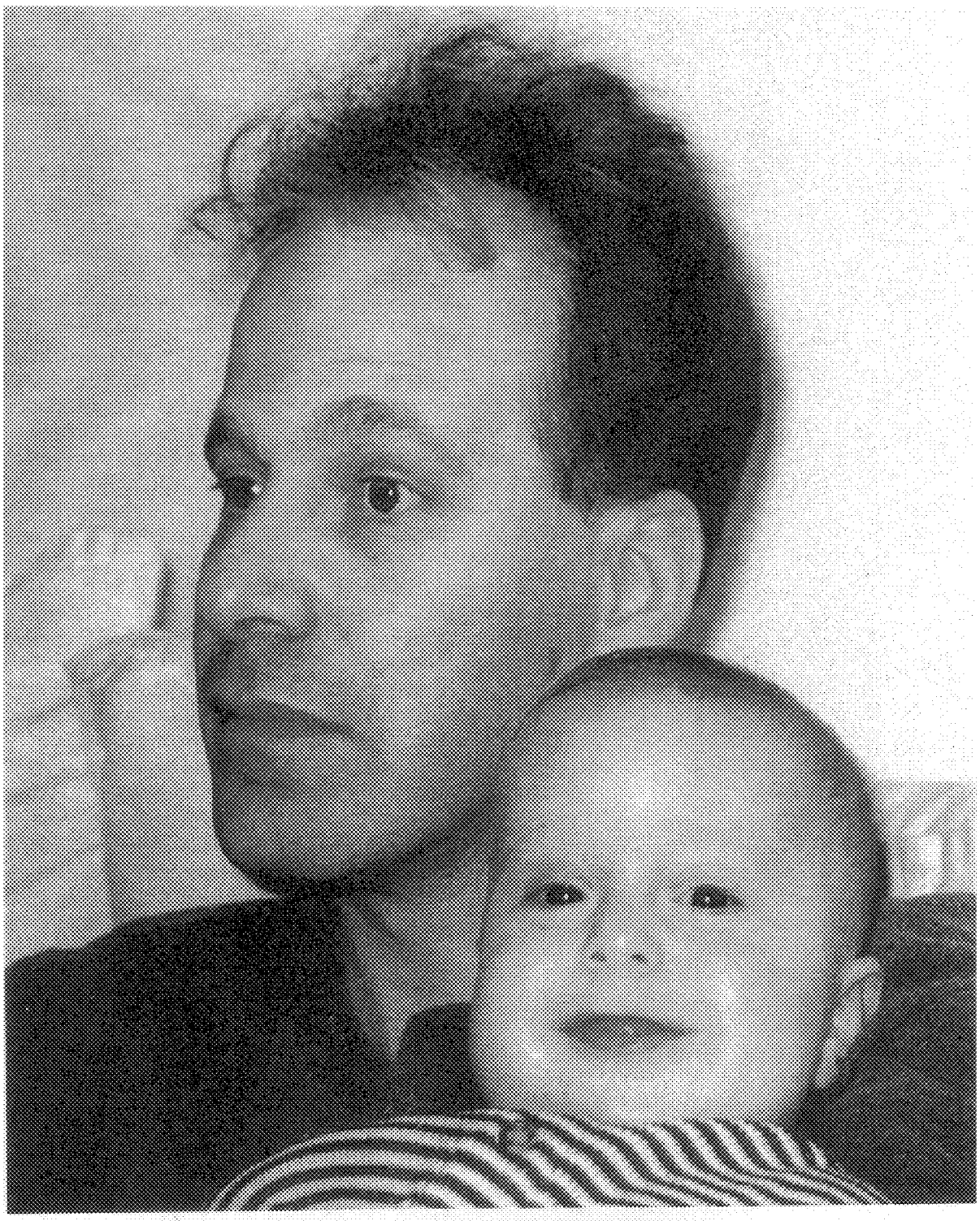
FIG. 10 is a color photograph showing another exemplary input image.

The black-white image is generated using a gray scale color model which has only one color plane. Some images may have a more complex digital structure and may include a plurality of color planes (e.g., three color planes—a Red-Green-Blue RGB color model, a Hue Saturation Intensity HSI color model, a Lamination Phase Quadrance YIQ color model or four color planes—a Cyan-Magenta-Yellow-Black CMYK color model). For example, FIGS. 9 and 10 are provided in color and include a plurality of color planes. FIG. 9, which shows a woman, as an exemplary input image (e.g., the far image FI) and FIG. 10, which shows a man with a baby, as another exemplary input image (e.g., the near image NI).

Each pixel of the image may be referenced using a corresponding row number (e.g., X-plane coordinate) and a corresponding column number (e.g., Y-plane coordinate). For example, a notation "NI[3][11]=45" may indicate that a particular pixel of the near image NI (which is located in a third row and in an eleventh column) has a color value of "45".

In addition, each pixel may have a color plane number CPN. For example, a notation "NI[2][3][2]=66" may indicate that a particular pixel of the near image NI is located in a second row and a third column. In addition, this notation may indicate that the near image NI has more than one color plane since the notation has the color plane number CPN of 2 (e.g., indicating the second color plane) for images having only one color plane, the color plane number CPN is not necessary. In this notation, the color value of a second color plane of the particular pixel is "66".

FIG. 1 shows an exemplary embodiment of a system 1 according to the present invention. The system 1 may include an input arrangement 10 such as, e.g., a keyboard, a voice recognition device, a touch-screen device, a floppy drive, a CD-ROM drive, a DVD drive, a communication device, a communication device receiving data from a network, etc. The input arrangement 10 may receive the near image NI and the far image FI from a predetermined source (e.g., a CD-ROM, a communication network, a floppy disk, etc.) And provide the near image NI and the far image to the system 1. The system 1 may also include an output arrangement 15 such as, e.g., a monitor, a printer, a communication device, etc. The output arrangement 15 provides the resulting image RI to a predetermined receiver.

The system 1 may include a processor 5 and a memory storage device 20. The processor 5 stores the near image NI and the far image FI received from the input arrangement 10 into the memory storage device 20. These images may be used, generated and/or received by the processor 5 executing the system and method according to the present invention.

Described below is a brief summary of an exemplary embodiment of the method according to the present invention executed by, e.g., the processor 5. A low frequency near image LFNI is generated as a function of the near image NI. Then, a low frequency far image LFFI is generated as a function of the far image FI. The resulting image RI is then generated as a function of the LFNI, the LFFI and the near image NI. It may also be possible to generate the resulting image RI as a function of the LFNI, the LFFI and the far image FI.

Figure 2A:
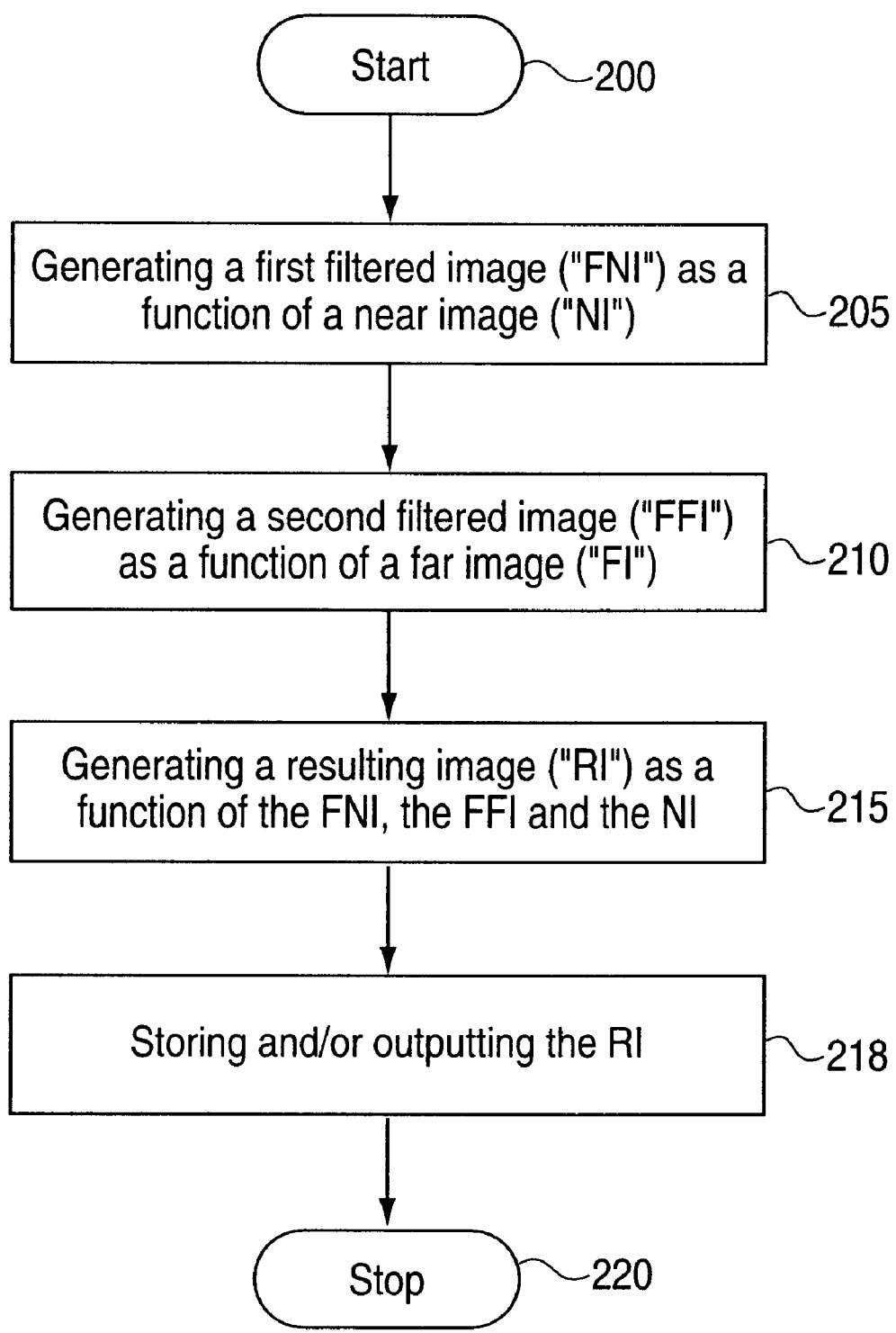
FIG. 2a shows an exemplary embodiment of a method according to the present invention.

FIG. 2a shows an exemplary embodiment of a method according to the present invention executed by the system 1 (e.g., using the processor 5). In step 205, the LFNI is generated as a function of the near image NI. In the step 210, the LFFI is generated as a function of the far image FI.

To generate the LFNI and the LFFI, the system 1 may utilize a frequency threshold ("FT") which defines a visual frequency border separating the near image NI and the far image FI. The frequency threshold FT may be a predetermined percentage value, which may be, e.g., between 0% and 100%. Any frequency value above the frequency threshold FT from the near image NI would be included in the resulting image RI, and any frequency value under the frequency threshold FT from the far image FI would also be included in the resulting image RI.

The frequency threshold FT may be adjusted either automatically by the system 1 or by the user. For example, a higher value of the frequency threshold FT, which provides a greater emphasis of the near image NI, is associated with the resulting image RI. Thus, the near image NI may be more visible from a greater range of distances. Alternatively, the processor of the system 1 may adjust the frequency threshold FT according to a predetermined parameter (e.g., using a predefined procedure) if a predetermined event occurs. For example, upon detecting one or more particular features in the near image NI and/or in the far image FI, the processor 5 of the system 1 may adjust the frequency threshold FT accordingly. In step 215, the processor 5 of the system 1 may generate the resulting image RI as a function of the LFNI, the LFFI and the near image NI. Subsequently, the resulting image RI is stored in the memory storage device 20 and/or outputted via the output arrangement 15 to a predetermined receiver (step 218).

Figure 2B:
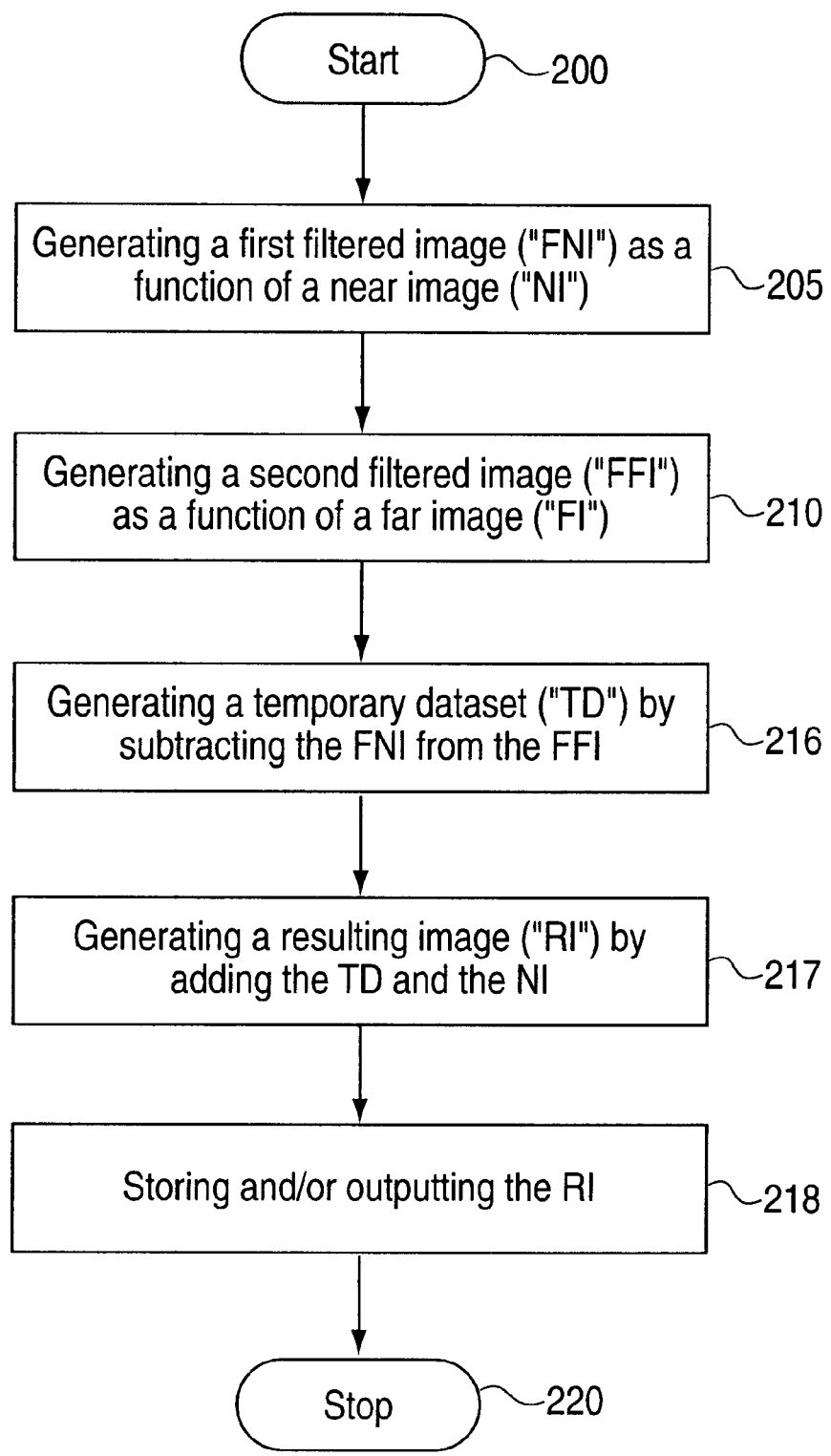

FIG. 2b shows another embodiment of the above-described method which is similar to the embodiment illustrated in FIG. 2a. In particular, this embodiment of the method is similar to the embodiment shown in FIG. 2a, except that step 215 of the method illustrated in FIG. 2a is replaced with steps 216 and 217. In step 216, the processor 5 subtracts the LFNI from the LFFI to create a temporary dataset ("TD"), which may be stored in the memory storage device 20:

$$TD = LFFI - LFNI \qquad (1).$$

Because subtracting the LFNI from the LFFI may result in a data set of negative numbers, such data set of negative numbers may not be stored as an image; thus, such set is stored as this temporary dataset TD. Subsequently in step 217, the temporary dataset TD is added to the near image NI for generating the resulting image RI, i.e.:

$$RI = TD + NI \qquad (2).$$

It is also possible to replace formulas (1) and (2) with the following formula:

$$RI = (LFFI - LFNI) + NI \qquad (3).$$

In the steps 205 and 210, the LFNI and the LFFI may also be generated using a filtering process. The filtering process may, e.g., remove, displace and/or obscure high frequency details of the near image NI and the far image FI. There are a number of conventional filtering processes that may be utilized in steps 205, 210. For example, the filtering process may include a blur filtering process, a mosaic filtering process, a random displacement of pixels filtering process, etc. (as described in detail below). Other filtering processes (e.g., a gaussian blur process, a sub-sampling process, a pixelization process, a color depth reduction process, etc.) may also be utilized.

As described above, the LFNI and the LFFI may be generated using one of a plurality of the filtering processes (steps 205 and 210). The blur filtering process, the mosaic filtering process and the random displacement-of-pixels filtering process are described below. The filtering processes may be combined, e.g., one filtering process may be used for the near image NI and another filtering process may be used for the far image FI. In another embodiment according to the present invention, a particular image may be filtered using a plurality of filtering processes.

For reasons of simplicity, the above described filtering processes may accept "an input image" (e.g., the near image NI and/or the far image FI) and generate "an output image" (e.g., the LFNI and/or the LFFI).

Figure 3:
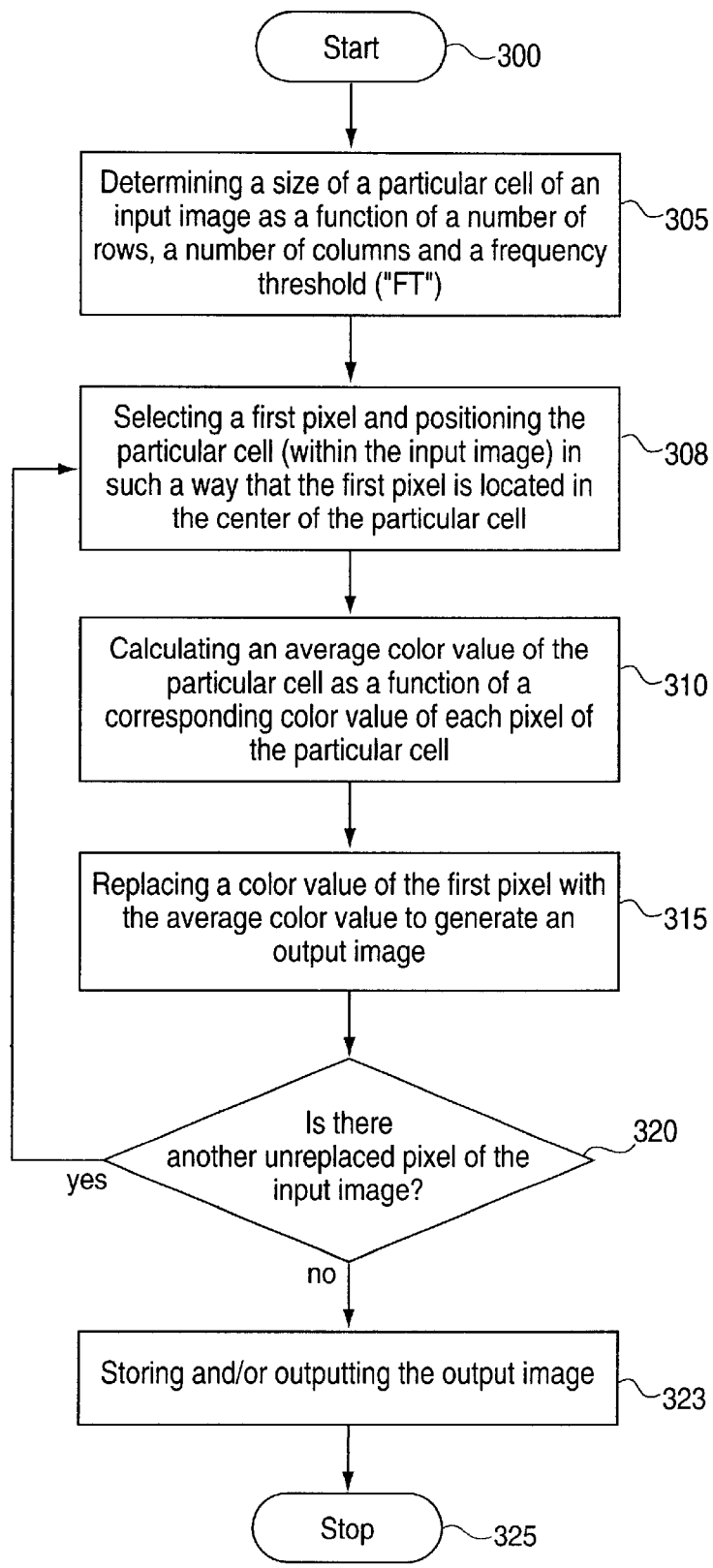
FIG. 3 shows a first exemplary embodiment of the filtering process.

FIG. 3 shows an exemplary embodiment of the blur filtering process according to the present invention. In step 305, a size of a cell of the input image (i.e., a number of pixels within a particular block of the input image) is determined as a function of at least one of a number of columns of the input image, a number of the rows of the input image and the frequency threshold FT. The particular cell has a center pixel. In step 308, a first pixel is selected, and the particular cell (within the input image) is positioned in such way that the first pixel is located in the center of the particular cell. An average color value of the particular cell is calculated as a function of a corresponding color value of each pixel within the particular cell (step 310). A color value of the center pixel of the particular cell is then replaced with the average color value to generate the output image (step 315). The steps 308–315 are repeated for each pixel of the input image (step 320). It should be noted that the blur filtering process increments one pixel at a time. Then, the output image is stored and/or outputted to the predetermined receiver (step 323).

Figure 7:
FIG. 7 shows an exemplary resulting image generated by the system or method according to the present invention.

An exemplary utilization of the blur filtering process may be seen in FIG. 7. FIG. 7 shows an exemplary resulting image RI which is generated using the method described above and shown, e.g., in FIG. 2a and/or FIG. 2b. This resulting image RI is generated using the near image NI (which is shown, e.g., in FIG. 9) and the far image FI (which is shown, e.g., in FIG. 10). The LFNI and the LFFI (steps 205 and 210) are generated using the blur filtering process and the frequency threshold FT of 74%. Thus, when the resulting image RI is viewed from a first distance (e.g., two feet), it resembles the man with the baby shown in FIG. 10. On the other hand, when the resulting image RI is viewed from a second distance which is longer that the first distance (e.g., fifteen feet), it resembles the woman shown in FIG. 9.

Figure 4:
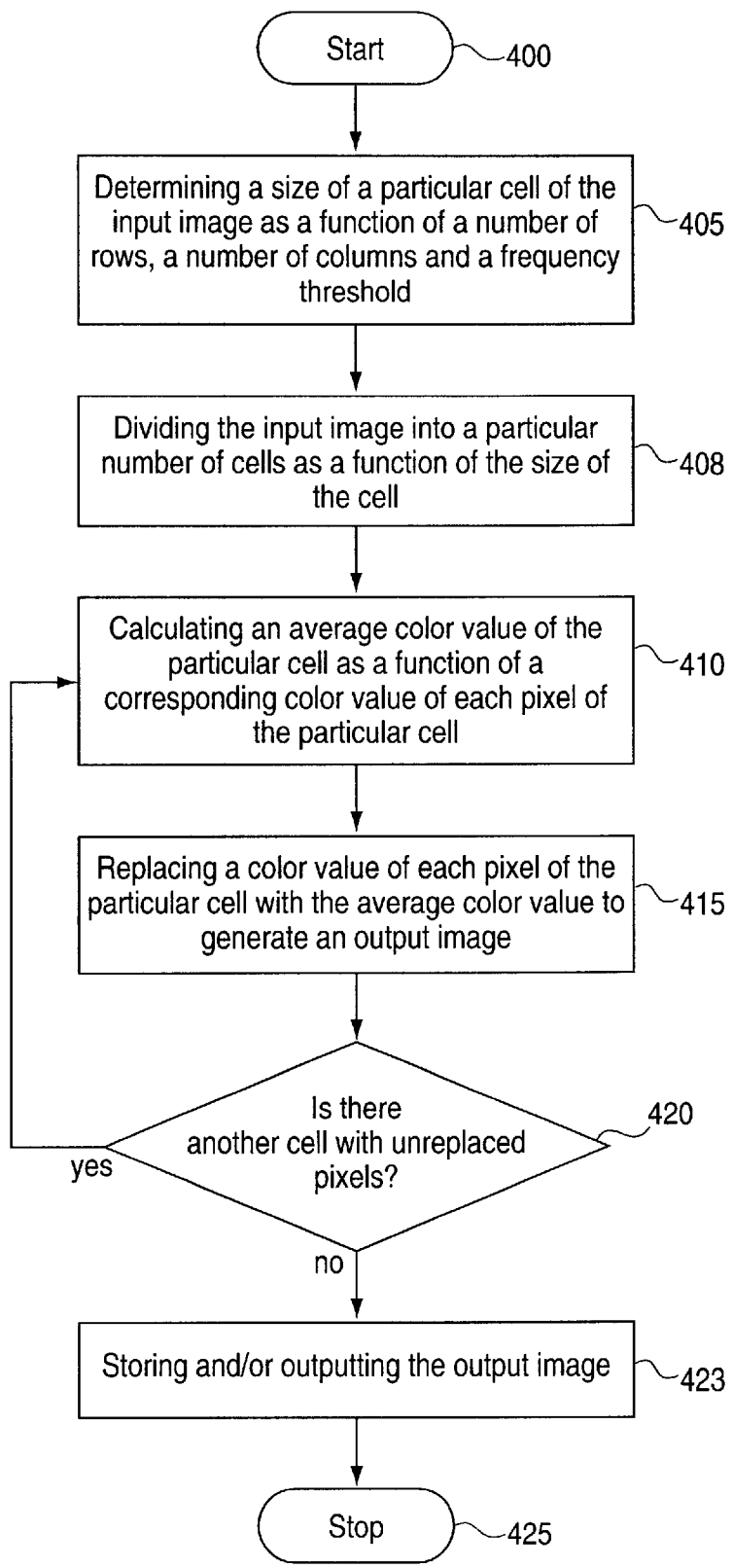
FIG. 4 shows a second exemplary embodiment of the filtering process.
Figure 8:
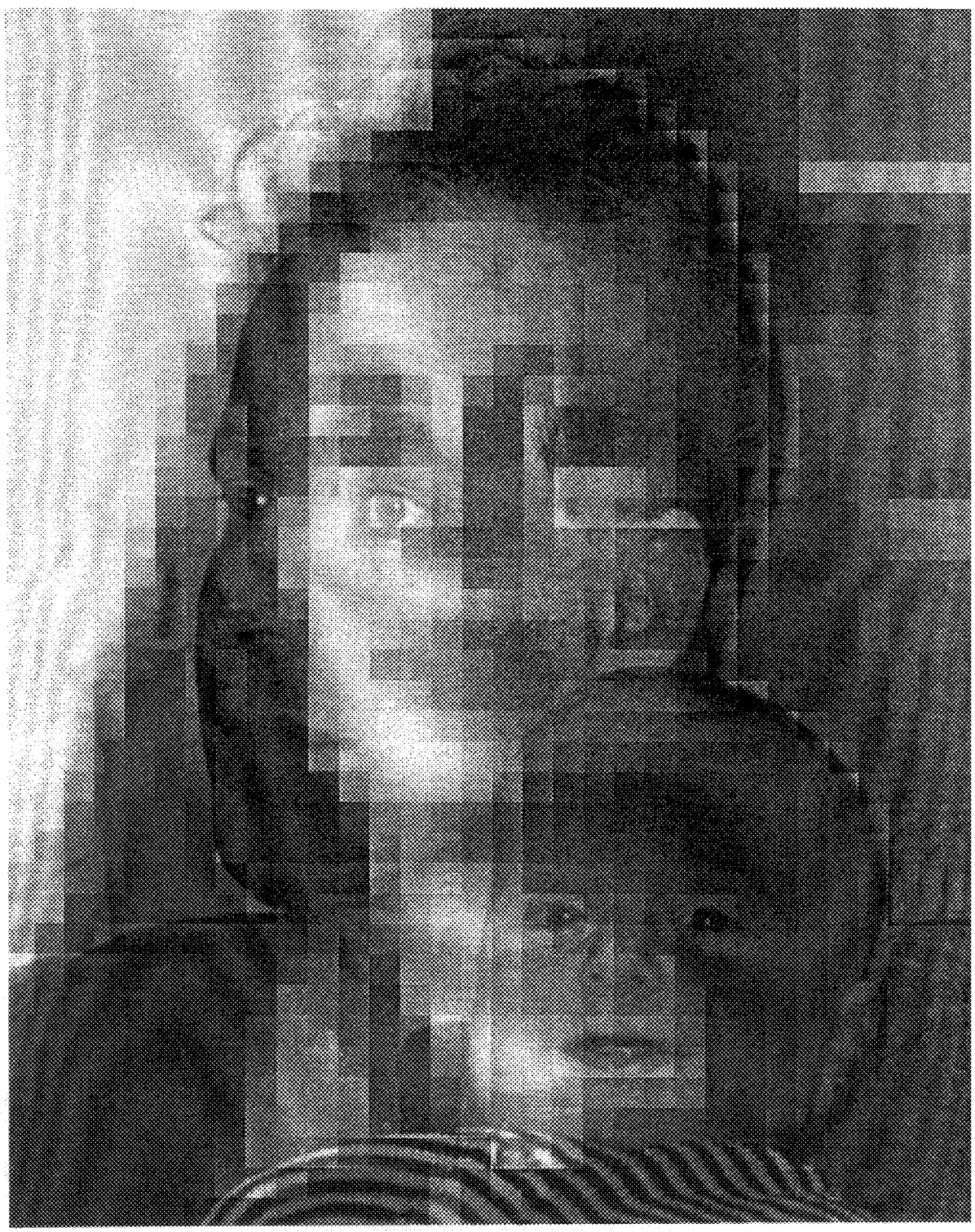
FIG. 8 shows another resulting image.

FIG. 4 shows an exemplary embodiment of the mosaic filtering process according to the present invention. The mosaic filtering process is substantially similar to the above-described blur filtering process, except that step 308 is replaced with step 408, and step 315 is replaced with step 415. In step 408, the input image is divided into a particular number of cells as a function of the size of the cell. In step 415, a color value of each pixel of the particular cell is then replaced with the average color value. Another difference between the blur filtering process and the mosaic filtering process is that the mosaic filtering process increments one cell at a time, instead of one pixel at a time (as performed by the blur filtering process) (see step 420). The mosaic filtering process is utilized in generating an exemplary resulting image RI, which is shown, e.g., in FIG. 8. This resulting image RI is generated in a similar manner as the resulting image RI (which is shown in FIG. 7), except that the LFNI and the LFFI are generated using the mosaic filtering process.

Figure 5:
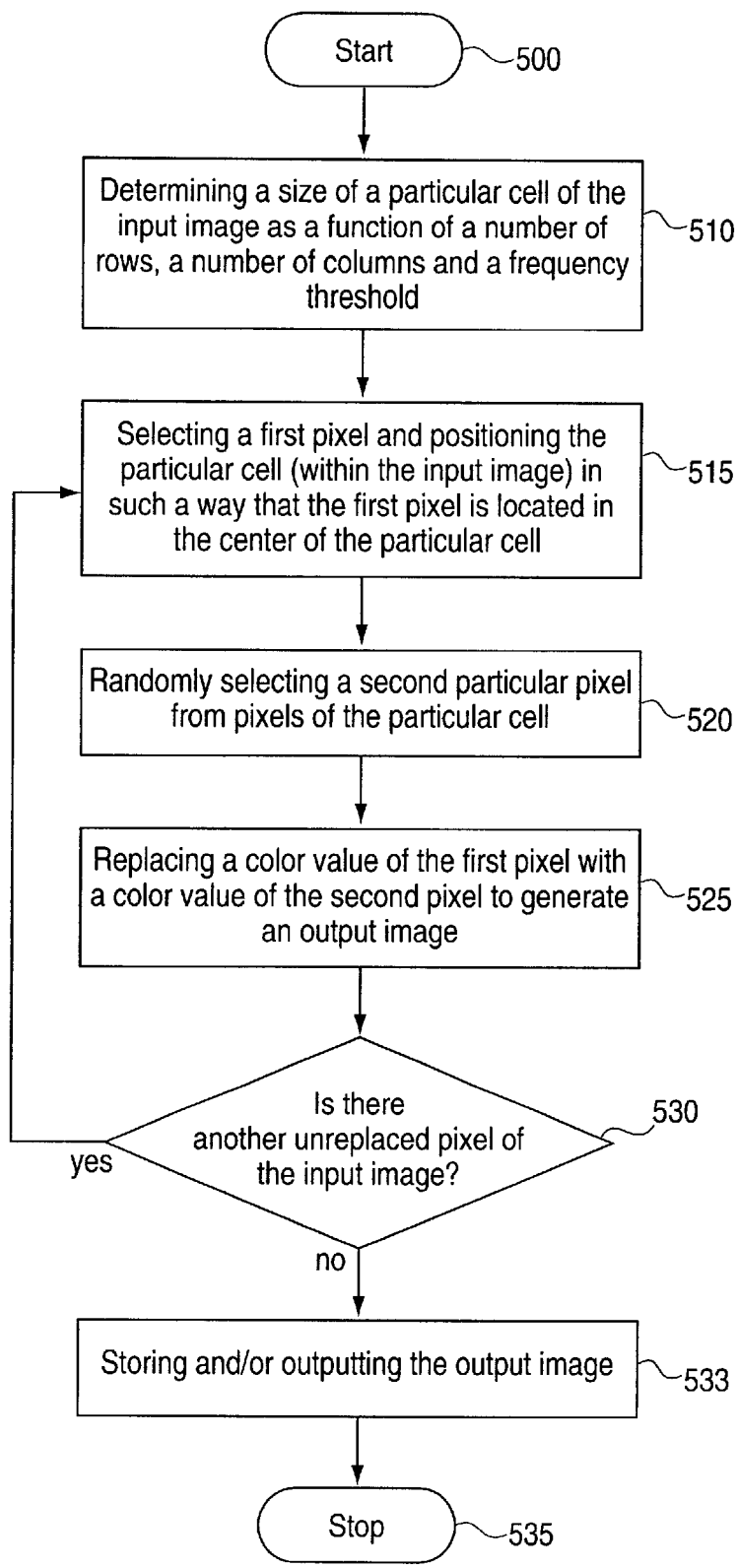
FIG. 5 shows a third exemplary embodiment of the filtering process.

FIG. 5 shows an exemplary embodiment of the random-displacement-of-pixels filtering process according to the present invention. Step 510 is similar to step 305 as described above and shown in FIG. 3. In step 515, a first pixel is selected and the particular cell (within the input image) is positioned in such a way that the first pixel is located in the center of the particular cell. A second pixel is randomly selected from the pixels of the particular cell (step 520). In step 525, a color value of the first pixel is replaced with a color value of the second pixel to generate the output image. The steps 515–525 are repeated for each pixel of the input image (step 530). Then, the output image is stored and/or outputted to the predetermined receiver (step 533).

Figure 2C:
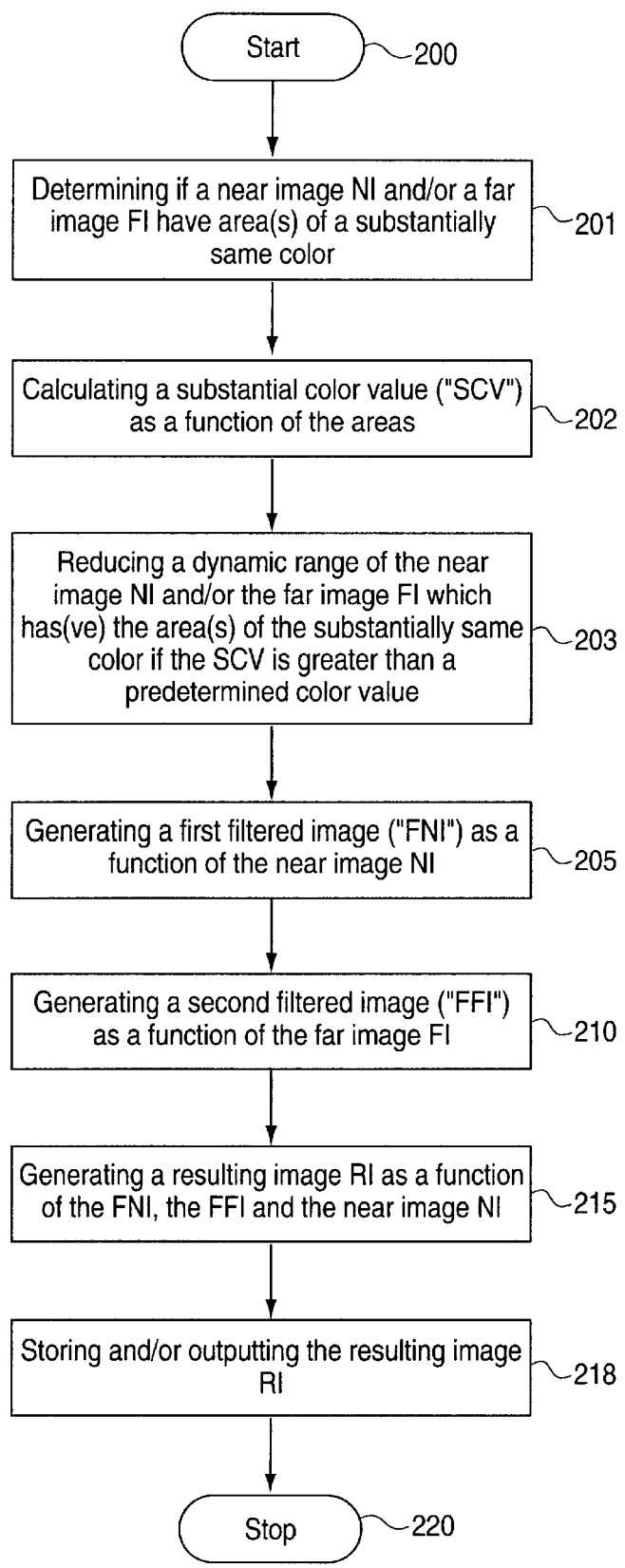

FIG. 2c shows an alternative embodiment of the method according to the present invention which may include the following additional steps. In step 201, color values of the pixels of the near image NI and/or the far image FI are verified to determine whether such images have any areas (i.e., a plurality of pixel positioned within a predetermined distance of each other) where the color values of the pixels are outside of at least one predetermined threshold range. If the color values of the pixels of a particular area are outside of the predetermined range, than the pixels are may have a very dark, a very bright color, etc. In step 203, the color value of the pixel is adjusted as a function of the existing color value, the predetermined threshold range and/or an adjusting threshold range. Such adjusting of the color values may allow a generation of a more effective resulting image RI. Generally, this dynamic range reduction may be better suited for the far image FI then the near image NI.

In another alternative embodiment of the method according to the present invention, separate frequency thresholds for the near image NI and for the far image FI are utilized. In step 205, a near frequency threshold may be utilized for the near image NI, and in step 210, a far frequency threshold may be utilized for the far image FI. In the preferred embodiment of the present invention, the near frequency threshold has a higher frequency than the frequency of the far frequency threshold.

Figure 6A:
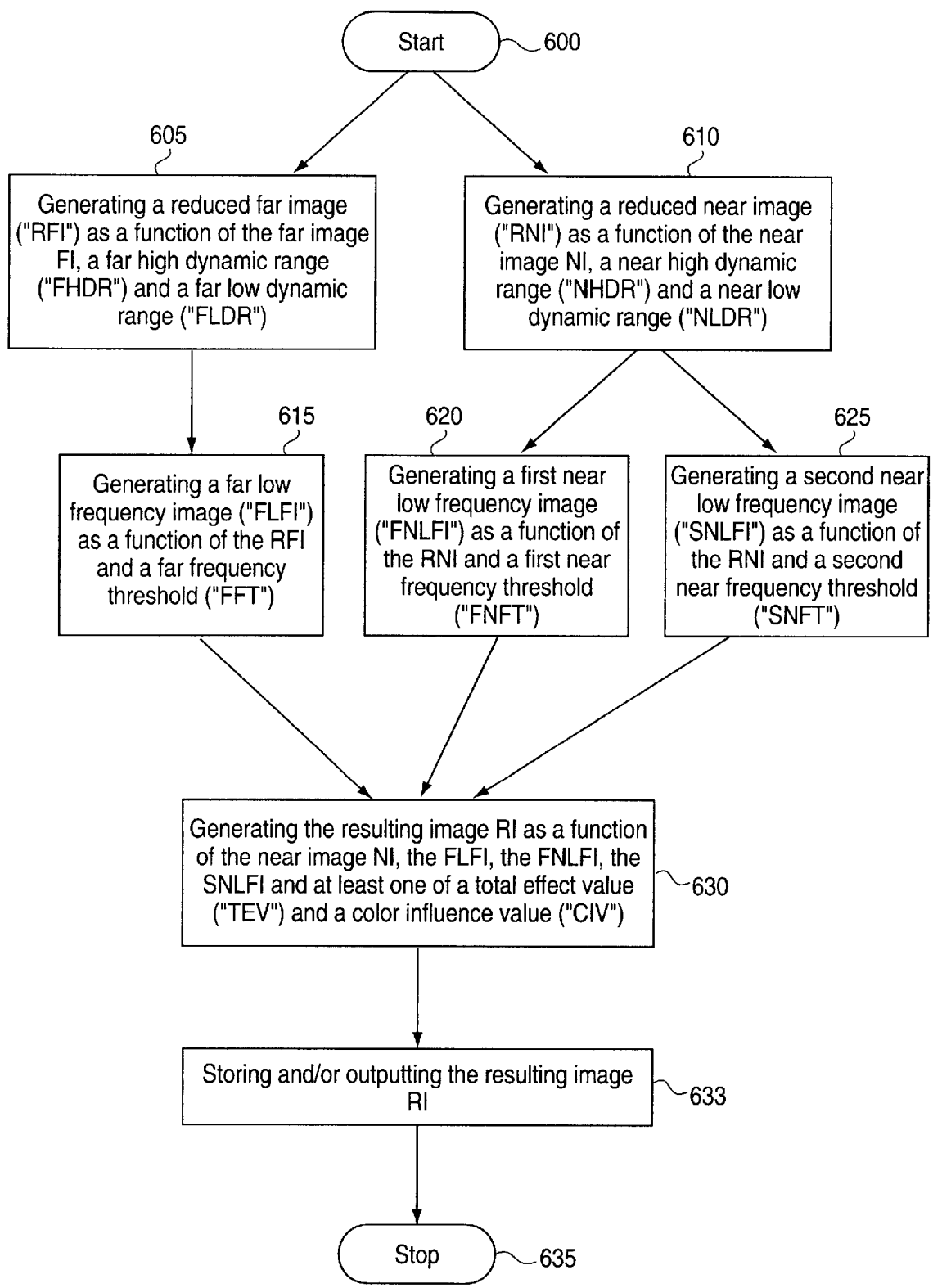
FIG. 6a shows a further exemplary embodiment of the method according to the present invention.

FIG. 6a shows another exemplary embodiment of the method according to the present invention. In the step 605, a reduced far image ("RFI") is generated (using a reduction process described in detail below) as a function of the far image FI, a far high dynamic range ("FHDR") and a far low dynamic range ("FLDR"). For example, the RFI may be generated according to the following formula:

$$RFI[\text{plane}]=FI*\{(FHDR-FLDR)/255\}+FLDR \qquad (4).$$

The FLDR and the FHDR are parameters which may have a range between, e.g., 0 and 255. The FLDR may be utilized to define a lower end of a range of a replacement color value for pixels of the far image FI, and the FHDR may be utilized to define a higher end of the range.

In step 610 shown in FIG. 6a, the reduction process is utilized to generate a reduced near image ("RNI") as a function of the near image NI, a near high dynamic range ("NHDR") and a near low dynamic range ("NLDR"). The NLDR and the NHDR are parameters which may have a range between, e.g., 0 and 255. The NLDR may be utilized to define a lower end of a range of a replacement color value for pixels of the near image NI, and the NHDR may be utilized to define a higher end of the range.

In step 615, a far low frequency image ("FLFI") is generated as a function of the RFI and a far frequency threshold ("FFT") using, e.g., the filtering process described above (e.g., the filtering processes shown in FIGS. 3–5). The FFT is a parameter which may have a range between, e.g., 0 and 100, and may be utilized to define a particular frequency threshold for the far image FI. Any features of a frequency which is below the FFT (provided from the far image FI) may be included in the resulting image RI. Thus, if the FFT has a higher value, more visual emphasis would be given to the far image FI. The FFT may also be utilized in step 210 instead of the frequency threshold FT.

In step 620, a first near low frequency image ("FNLFI") is generated as a function of the RNI and a first near frequency threshold ("FNFT"). In step 625 (either simultaneously with step 620 or during a different time period), a second near low frequency image ("SNLFI") is generated as a function of the RNI and a second near frequency threshold ("SNFT"). The steps 620 and 625 may utilize the filtering process described above (e.g., the filtering processes shown in FIGS. 3–5).

The FNFT is a parameter which may have a range between, e.g., 0 and 100, and may be utilized to define a particular frequency threshold for the near image NI. Preferably, only the features of the frequencies above the frequency of the FNFT (from the near image NI) may be included in the resulting image RI. Thus, if the FNFT has a lower value, more visual emphasis would be placed on the near image NI. The FNFT may also be utilized in step 205 instead of the frequency threshold FT.

The SNFT is a parameter which may have a range between, e.g., 0 and 100, and may be utilized to define a frequency threshold that may be used for the near image NI. Preferably, only the features of the frequencies under the SFTF (from the near image NI) may be included in the resulting image RI. Thus, if the SFTF has a higher value, more visual emphasis would be placed on the near image NI. The SFTF may be utilized, with the FTFT, in step 205 instead of the frequency threshold FT. The SFTF may be higher then the FNFT to include features of the near image NI within the resulting image RI.

In step 630, the resulting image RI is generated (using a composing process, which is described below) as a function of a total effect value ("TEV"), a color influence value ("CIV"), the near image NI, the FLFI, the FNLFI and/or the SNLFI. Subsequently the output image is stored and/or outputted to the predetermined receiver (step 633).

The CIV is a parameter which may have a range between, e.g., 0 and 100, and may be utilized to define a proportionality of color values of the near image NI and/or the far image FI which may influence the colors of the resulting image RI. For instance, if the CIV is close to 0, then the color of the far image FI would be dominant in the resulting image RI, while, if the CIV is close to 100, then the colors of the near image NI would be dominant in the resulting image The TEV is a parameter which may have a range between, e.g., 0 and 100, and may be utilized to define an extent in which the effect will be applied. For example, if the TEV is close to 0, then the resulting image RI may appear substantially similar (e.g., uniform) to the near image NI. On the other hand, if the TEV is closer to "100", then the resulting image RI may have a maximum effectiveness of being perceived as the far image FI at a different distance. Thus, the TEV may allow the user to control the total effect of the resulting image RI by adjusting the TEV.

In alternative exemplary embodiment of the present invention, the resulting image RI may be generated without utilizing step 605 and/or step 610. It should be also noted that step 620 and/or step 625 may be used to generate the resulting image. Those skilled in the art would understand that other permutations of above-described steps are conceivable; however, at minimum, the following steps are preferable for generating the resulting image RI: (1) step 615, (2) step 620 and/or step 625, and (3) step 630.

Figure 11:
FIG. 11 is a color photograph shown yet another exemplary resulting image.
Figure 12:
FIG. 12 is a color photograph showing a further exemplary resulting image.

For example, FIG. 11 shows the resulting image RI which is executed in color and generated according to steps 615, 620 ad 630 as described above and shown in FIG. 6*a*. The resulting image RI is generated using the near image NI (e.g., shown in FIG. 10) and the far image FI (e.g., shown in FIG. 9). In addition, the resulting image RI is generated using the mosaic filtering process in steps 615 and 620, and the CIV which has value of "0" in step 630 (the TEV is not utilized to generate this resulting image RI). Similarly to the resulting images shown in FIGS. 7 and 8, this resulting image RI resembles the man with the baby shown in FIG. 10 when viewed from the first distance. On the other hand, when the resulting image RI is viewed from the second distance, which is longer that the first distance, it resembles the woman shown in FIG. 9. FIG. 12 shows another color photograph of the resulting image RI which is generated in a substantially similar manner as the resulting image RI shown in FIG. 11, except this resulting image utilizes the mosaic filtering process in steps 615 and 620, and the CIV which has value of "100" in step 630.

Figure 6B:
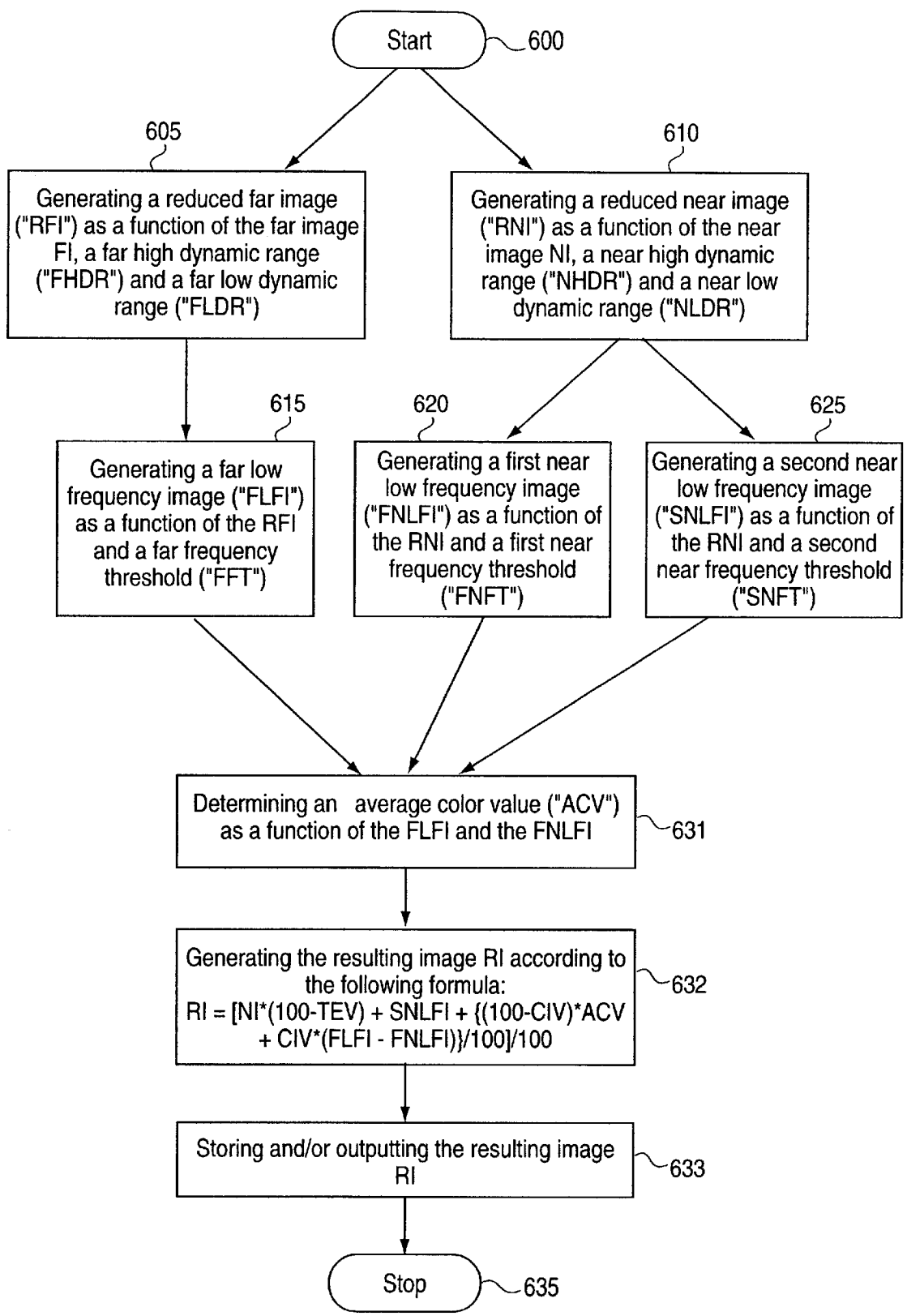

FIG. 6*b* shows another exemplary embodiment of the method which is similar to the embodiment illustrated shown in FIG. 6*a*, except that step 630 is replaced with steps 631 and 632. In step 631, an average color value ("ACV") is calculated as a function of the FLFI and the FNLFI. In particular, the ACV of a pixel may be an average value of all color planes of a difference value between the FLFI and the FNLFI at a particular pixel location. For example, the ACV of a particular pixel, which located at x=1 and y=1 and has three color planes, may be calculated according to the following formula:

$$ACV=(\{FLFI[1][1][1]-FNLFI[1][1][1]\}+\{FLFI[1][1][2]-FNLFI[1][1][2]\}+\{FLFI[1][1][3]-FNLFI[1][1][3]\})/3 \quad (5).$$

Subsequently, in step 632, a color value of a pixel of the resulting image RI is determined according to the following formula:

$$RI=[NI^*(100-TEV)+SNLFI+\{(100-CIV)^*ACV+CIV^*(FLFI-FNLFI)\}/100]/100 \quad (6),$$

where TEV is the total effect value, SNLFI is the second near low frequency image, CIV is the color influence value, ACV is the average color value, FLFI is the far frequency image and FNLFI is the first near low frequency image. Those skilled in the art would understand that other variations of the formula (5) are conceivable.

In an alternative embodiment of the present invention, a plurality of the near images NI and a plurality of the far images may be processed to generate, e.g., a motion picture, a video, a 3D movie, animation, etc., which includes a plurality of the resulting images RI, which may be sequentially viewed.

In another alternative embodiment of the method according to the present invention, three or more input images may be combined into the resulting image RI. First, a preliminary resulting image is generated as a function of a preliminary near image and a preliminary far image. Then, the resulting image RI is generated as a function of the preliminary resulting image and one of a further near image, a further far image and another input image. The preliminary resulting image and the resulting image RI may be generated according to at least one of the above-described methods.

One of the advantages of the present invention is that the resulting image RI may be printed in color and/or in gray scale. The resulting image RI may also be viewed on a monitor, posted on the Internet and/or used in any other manner in which images may be used (e.g., the motion pictures, etc.). In addition, viewing the resulting image RI does not require any special viewing equipment.

The ability to present two images in one space is also advantageous because it may be cost effective, may require less space and may be aesthetically pleasing to the user. Furthermore, the system and method according to the present invention provides a tool for attracting (teasing) a viewer with a broad image and then delivering additional details or a punch line. The system and method according to the present invention may be suitable for a large scale advertising, e.g., providing the resultant image RI on billboards where range of user viewing is large and controlled (e.g., the viewer may be driving towards a billboard in a car).

Another advantage of the present invention is that the user may control the resulting image RI using the method and system according to the present invention. Alternatively, the system 1 may control the resulting image RI according to the predetermined parameters without any user interaction.

Several embodiments of the present invention are specifically illustrated and/or described herein. However, it will be appreciated that modifications and variations of the present invention are covered by the above teachings and are within the purview of the appended claims without departing from the spirit and intended scope of the present invention.

What is claimed is:

1. A method for generating a resulting image, comprising the steps of:
   (a) receiving at least one first input image;
   (b) receiving at least one second input image;
   (c) generating a first filtered image by manipulating high frequency components of the at least one first input image;
   (d) generating a second filtered image by manipulating high frequency components of the at least one second input image; and
   (e) generating the resulting image as a function of the first filtered image, the second filtered image and the at least one second input image,
   wherein a user is capable of observing the at least one first input image when the user views the resulting image at a first predetermined distance, and wherein the user is capable of observing the at least one second input image when the user views the resulting image at a second predetermined distance.

2. The method according to claim 1, wherein the first predetermined distance is different from the second predetermined distance.

3. The method according to claim 1, wherein the first predetermined distance is smaller than the second predetermined distance.

4. The method according to claim 1, further comprising the step of:
   (f) storing the resulting image in a storing arrangement.

5. The method according to claim 1, further comprising the step of:
   (g) providing the resulting image to a predetermined arrangement.

6. The method according to claim 1, wherein the first and second filtered images are generated using a predetermined threshold value.

7. The method according to claim 6, wherein the predetermined threshold value is adjustable.

8. The method according to claim 1, wherein step (e) includes the following substeps:
   (I) generating a dataset as a function of the first filtered image and the second filtered image, and
   (II) generating the resulting image as a function of the dataset and the at least one second input image.

9. The method according to claim 1, further comprising the steps of:
   (h) before step (c), determining if at least one of the first input image and the second input image includes at least one further pixel having a corresponding color value which is disposed outside of a predetermined threshold range; and
   (i) if the at least one further pixel exists, adjusting one of the least one further pixel and the corresponding input as a function of at least one of the predetermined threshold range, the color value of the at least one further image and a predetermined adjusting range.

10. The method according to claim 1, further comprising the step of:
    (j) repeating steps (c)–(e) to generate a further resulting image as a function of the resulting image and one of the at least one first input image, at least one second input image and at least one further input image.

11. The method according to claim 1, wherein the resulting image is followed by at least one further resulting image to generate a series of displays which, when sequentially viewed, provide a motion picture.

12. The method according to claim 1, wherein step (c) includes the following substeps:
    (I) generating a first reduced image as a function of the at least one first input image, a first high threshold value and a first low threshold value, and
    (II) generating a first low frequency image as function the first reduced image and a first reduced threshold value, and
    wherein step (d) includes the following substeps:
    (I) generating a second reduced image as a function of the at least one second input image, a second high threshold value and a second low threshold value, and
    (II) generating a second low frequency image as a function of the second reduced image and a second reduced threshold value.

13. The method according to claim 12, wherein step (e) includes the following substeps:
    (I) generating a third low frequency image as a function of the second reduced image and a third reduced threshold value, and
    (II) generating the resulting image as a function of at least one of the first low frequency image, the second low frequency image, the third low frequency image, the at least one second input image, a predetermined total effect value and a color influence value.

14. The method according to claim 13, wherein step (e) includes the following substeps:
    (III) determining a corresponding average color value as a function of the first low frequency image and the second low frequency image, and
    (IV) generating the resulting image as a function of at least one of the first low frequency image, the second low frequency image, the third low frequency image, the at least one second input image, the predetermined total effect value, the corresponding average color value and the color influence value.

15. The method according to claim 14, wherein the resulting image is generated according to the following formula:

$$RI=[SII*(100-TEV)+TLFI+\{(100-CIV)*ACV+CIV*(FLFI-SLFI)\}]/100]/100,$$

wherein RI is the resulting image, NI is the at least one second input image, TEV is the predetermined total effect value, TLFI is the third low frequency image, CIV is the color influence value, ACV is the corresponding average color value, FLFI is the first low frequency image, and SLFI is the second low frequency image.

16. The method according to claim 1, wherein step (c) includes the following substeps:
    (I) generating a first reduced image as a function of the at least one first input image, a first high threshold value and a first low threshold value, and
    (II) generating a first low frequency image as function the first reduced image and a first reduced threshold value, and
    wherein step (e) includes the following substep:
    (i) generating the resulting image as a function of the first low frequency image, the second low frequency image, the at least one second input image and at least one of a predetermined total effect value and a color influence value.

17. The method according to claim 1, wherein step (d) includes the substeps:
    (I) generating a second reduced image as a function of the at least one second input image, a second high threshold value and a second low threshold value, and (II) generating the second low frequency image as a function of the second reduced image and a second reduced threshold value, wherein step (e) includes the following substep:

(I) generating the resulting image as a function of the first low frequency image, the second low frequency image, the at least one second input image and at least one of a predetermined total effect value and a color influence value.

18. The method according to claim 17, wherein step (e) includes the following substep:

(I) generating a third low frequency image as a function of the second reduced image and a third reduced threshold value, wherein step (e) includes the substep:

(I) generating the resulting image as a function of the first low frequency image, the second low frequency image, the third low frequency image, the at least one second input image and at least one of a predetermined total effect value and a color influence value.

19. The method according to claim 1, wherein step (e) includes the following substeps:

(I) determining a corresponding average color value as a function of the first filtered image and the second filtered image, and (II) generating the resulting image as a function of the first filtered image, the second filtered image, the at least one second input image, the predetermined total effect value, the corresponding average color value and the color influence value.

20. The method according to claim 1, wherein the resulting image is generated according to the following formula:

$$RI=[SII*(100-TEV)+TLFI+\{(100-CIV)*ACV+CIV*(FLFI-SLFI)\}/100]/100,$$

wherein RI is the resulting image, NI is the at least one second input image, TEV is a predetermined total effect value, TLFI is the third low frequency image, CIV is a color influence value, ACV is the corresponding average color value, FLFI is the first low frequency image, and SLFI is the second low frequency image.

21. A method for generating a resulting image, comprising the steps of:

(a) receiving at least one first input image;

(b) receiving at least one second input image;

(c) generating a first reduced image as a function of the at least one first input image, a first high threshold value and a first low threshold value;

(d) generating a second reduced image as a function of the at least one second input image, a second high threshold value and a second low threshold value;

(e) generating a first low frequency image as function the first reduced image and a first reduced threshold value;

(f) generating a second low frequency image as a function of the second reduced image and a second reduced threshold value;

(g) generating a third low frequency image as a function of the second reduced image and a third reduced threshold value; and (h) generating the resulting image as a function of the first low frequency image, the second low frequency image, the third low frequency image and the at least one second input image, wherein a user is capable of observing the at least one first input image when the user views the resulting image at a first predetermined distance, and wherein the user is capable of observing the at least one second input image when the user views the resulting image at a second predetermined distance.

22. The method according to claim 21, wherein the first predetermined distance is different from the second predetermined distance.

23. The method according to claim 21, wherein the first predetermined distance is smaller than the second predetermined distance.

24. A system for generating a resulting image, comprising:

a processor retrieving at least one first input image and at least one second input image, the processor generating a first filtered image by manipulating high frequency components of the at least one first input image, and a second filtered image by manipulating high frequency components of the at least one second input image, wherein the process generates the resulting image as a function of the first filtered image, the second filtered image and the at least one second input image, wherein a user is capable of observing the at least one first input image when the user views the resulting image at a first predetermined distance, and wherein the user is capable of observing the at least one second input image when the user views the resulting image at a second predetermined distance.

25. The system according to claim 24, wherein the first predetermined distance is different from the second predetermined distance.

26. The system according to claim 24, wherein the system performs at least one of receiving and generating at least one of the first input image and the second input image.

27. The system according to claim 24, further comprising:

an input arrangement receiving the first and at least one second input image.

28. The system according to claim 24, further comprising:

an output arrangement providing the resulting image to a predetermined receiver.

29. The system according to claim 24, further comprising:

a memory device storing at least one of the resulting image, the at least one first image and the at least one second input image.

30. The system according to claim 24, wherein the system generates a plurality of the resulting images to form a motion picture.

31. A computer-readable storage medium storing a set of instructions, the set of instructions capable of being executed by a processor to generate a resulting image, the set of instructions performing the steps of:

(a) receiving at least one first input image;

(b) receiving at least one second input image;

(c) generating a first filtered image by manipulating high frequency components of the at least one first input image;

(d) generating a second filtered image by manipulating high frequency components of the at least one second input image; and (e) generating the resulting image as a function of the first filtered image, the second filtered image and the at least one second input image, wherein a user is capable of observing the at least one first input image when the user views the resulting image at a first predetermined distance, and wherein the user is capable of observing the at least one second input image when the user views the resulting image at a second predetermined distance.

* * * * *